United States Patent [19]

Luciani et al.

[11] Patent Number: 5,310,716
[45] Date of Patent: May 10, 1994

[54] CATALYST FOR THE POLYMERIZATION OF OLEFINS

[75] Inventors: Ludiano Luciani, Ferrara; Federico Milani, Maria Maddalena; Renzo Invernizzi, Milan; Italo Borghi, Ferrara; Antonio Labianco, Stienta, all of Italy

[73] Assignee: ECP Enichem Polimeri S.r.l., Milan, Italy

[21] Appl. No.: 918,577

[22] Filed: Jul. 22, 1992

[30] Foreign Application Priority Data

Jul. 25, 1991 [IT] Italy .................. MI91-A-002057

[51] Int. Cl.$^5$ .............................................. C08F 4/60
[52] U.S. Cl. .................................. 502/107; 502/104; 502/110; 502/115; 502/119; 502/120; 502/121; 502/123; 502/125; 502/126; 502/127
[58] Field of Search ............... 502/104, 107, 110, 115, 502/119, 120, 123, 121, 125, 126, 127

[56] References Cited

U.S. PATENT DOCUMENTS 4,252,670 2/1981 Caunt et al. ...................... 252/429 B
4,857,613 8/1989 Zolk et al. ......................... 502/127

FOREIGN PATENT DOCUMENTS 0014523 8/1980 European Pat. Off.
0184347 6/1986 European Pat. Off.

Primary Examiner—Patrick P. Garvin
Assistant Examiner—Brent M. Peebles
Attorney, Agent, or Firm—George P. Hoare, Jr.

[57] ABSTRACT

A supported solid component of catalyst, for the stereospecific polymerization of propylene and other α-olefins, is obtained by making a non-activated silica interact in succession with: (i) a magnesium dialkyl or halide of magnesium alkyl; (ii) a halogenating agent selected from silicon, tin and antimony halides; (iii) a titanium tetrahalide; and (iv) a Lewis base. A catalyst for the stereospecific polymerization of propylene and other α-olefins is composed of: (A) the solid component of catalyst; (B) an aluminium trialkyl or aluminium alkyl halide; and (C) an electron donor compound, capable of forming a complex compound with component (B).

26 Claims, No Drawings

CATALYST FOR THE POLYMERIZATION OF OLEFINS

DESCRIPTION

The present invention relates to a procedure for the production of a component of catalyst for the polymerization of α-olefins, the catalyst which incorporates the component thus obtained and a procedure for the polymerization of α-olefins using this catalyst.

Olefinic monomers such as ethylene, propylene and higher α-olefins can be polymerized using Ziegler-Natta catalysts, i.e. catalytic systems obtained by the combination of an organometallic compound of elements from groups IA to IIIA and a compound of a transition metal belonging to groups IVA to VIA of the Periodic Table (Boor Jr., "Ziegler-Natta Catalysts and Polymerization", Academic, New York, 1979).

When these catalysts are used in the polymerization of propylene and higher α-olefins there is the formation of a mixture of isotactic and atactic polymers, the isotactic polymer being the more valuable material for commercial purposes. The first problem consequently consists of orienting the polymerization of the olefin towards the prevalent or exclusive formation of the isotactic polymer. Another problem consists of reducing the content of catalytic residues obtained in the polymer to lower levels than those which can cause harmful effects in the subsequent processing and transformation phases.

Various proposals have been made in the art for improving the stereospecificity and the activity of the catalytic system. These proposals are generally based on a modification of the components of the catalytic system by introducing further components and typically Lewis bases and using a support for the transition metal, and typically a halide of a bivalent metal.

According to U.S. Pat. No. 4,252,670, a component of catalyst for the polymerization of olefins is obtained by treating an organic compound of magnesium with a halogenating agent, and adding a Lewis base and titanium tetrachloride to the reaction product thus obtained. According to U.S. Pat. No. 5,006,620 a component of catalyst for the polymerization of olefins is obtained by treating a silica in succession with an organic compound of magnesium, a gaseous chlorinating agent selected from chlorine and hydrochloric acid, a derivative of phthalic acid, a $C_{1-8}$ alkanol and titanium tetrachloride.

It has now been found according to the present invention, that a non-activated silica can interact with an organic compound of magnesium to give an activated support which can be easily halogenated with a silicon, tin or antimony halide. It has also been found that this activated and halogenated support can interact with titanium tetrachloride and particular Lewis bases to give, in a simple and economical way, a solid component of catalyst which is highly active in the polymerization of α-olefins in stereoregular polymers.

In accordance with this the present invention relates to a procedure for the preparation of a solid component of catalyst, active in the polymerization of propylene and other α-olefins into stereoregular polymers, composed of a silica support and a catalytically active part including magnesium, halogen, titanium and a Lewis base, said procedure comprising:

(i) the treatment of a non-activated silica support by contact of said silica with a solution, in an inert hydrocarbon solvent, of a magnesium dialkyl or halide of magnesium alkyl, operating with a weight ratio between the magnesium compound and the silica of 0.1/1 to 10/1, at a temperature ranging from 20° C. to the boiling point of the liquid phase, for a period which is sufficient to completely, or almost completely, deposit the magnesium compound on the silica;

(ii) the halogenation of the support treated in (i) by contact of said activated support with a solution, in an inert hydrocarbon solvent, of a halogenating agent selected from silicon, tin or antimony halides, operating with a molar ratio between the halogenating agent and the magnesium compound deposited in step (i) of 0.1/1 to 100/1, at a temperature of −20° to 100° C. and for a period of 0.5 to 5.0 hours;

(iii) the titanation of the support halogenated in step (ii) by contact of said halogenated support with an excess of a titanium tetrahalide either liquid or in solution in an inert, hydrocarbon solvent, operating at a temperature of 80° C. to 100° C. and for a period of 0.5 to 5.0 hours;

(iv) the formation of the solid component of catalyst by contact of the support titanated in (iii) with a Lewis base either liquid or in solution in an inert hydrocarbon solvent, operating with a molar ratio between said Lewis base and the magnesium compound absorbed in step (i) of 0.05/1 to 0.5/1, at a temperature of 80° to 120° C. for a period of 0.5 to 5.0 hours; and (v) the recovery of the solid component of catalyst from the reaction products of step (iv).

The silica suitable as a support for the catalyst of the present invention is preferably a microspheroidal, porous silica, with a particle size of 20 to 100 μm, with a surface area of 150 to 400 m²/g, a pore volume of 1.3 to 1.8 ml/g and an average pore diameter of 20 to 30 A (angstrom). This silica has not been pre-activated and consequently contains hydroxyls and water in a total quantity which is generally higher than 1% by weight up to a maximum value of 5% by weight.

In step (i) of the procedure of the present invention, the silica support is suspended in a solution, in an inert organic solvent, of a magnesium dialkyl or halide of magnesium alkyl.

The magnesium compounds suitable for the purpose are those which can be defined with the formulae MgRR' or MgR"X, wherein R, R' and R", each independently, represent an alkyl group, linear or branched, containing from 1 to 12 carbon atoms and X represents a halogen atom preferably chlorine. Specific examples are magnesium diethyl, magnesium ethyl butyl, magnesium dihexyl, magnesium butyl octyl and magnesium dioctyl, the corresponding chloroderivatives and a mixture thereof.

Examples of inert hydrocarbon solvents suitable for the purpose are aliphatic hydrocarbon solvents such as pentane, isopentane, hexane, heptane and octane.

In practice the support is added to the solution of the magnesium compound or preferably the support is suspended in an inert organic solvent, selected from those mentioned above and the solution of the magnesium compound in the same or other inert hydrocarbon solvent is slowly added to the suspension thus obtained.

The resulting suspension is kept at a temperature ranging from 20° C. to the boiling point of the liquid phase and preferably at a temperature of 50°–70° C.

In this step the magnesium compound is deposited onto the silica support and, to ensure success in the following step (ii), it is important to use a quantity of magnesium compound which is not higher than the absorption capacity of the support. For this purpose the weight ratio between the magnesium compound and the silica may be 0.1/1 to 10/1 and preferably 0.2/1 to 1.5/1 and in the very preferred form with a value of about 1/1.

Under the above conditions, the time necessary for the complete, or almost complete, absorption of the magnesium compound varies from 10 minutes to 2 hours, depending on the temperature chosen and in the preferred method is about 0.5-1.0 hours.

At the end of the treatment the solid is separated from the suspension, for example by sedimentation, filtration or centrifugation and is washed with an inert solvent, such as a liquid aliphatic hydrocarbon and possibly dried.

In step (ii) of the procedure according to the present invention, the support treated as described above is put in contact and interacted with a halogenating agent selected from silicon, tin and antimony halides.

The silicon halides suitable for the purpose are silicon chlorides and bromides and chloro and bromo silanes. Specific examples of these compounds are silicon tetrachloride, silicon tetrabromide, trichlorosilane, vinyl trichlorosilane, trichlorethoxy silane and chloroethyl trichlorosilane. Among these silicon tetrachloride is preferred.

Other suitable halogenating agents are tin and antimony chorides and bromides, such as tin tetrachloride, which is preferred, and antimony pentachloride.

In step (ii) the treated support is suspended in an inert organic solvent and generally an aliphatic hydrocarbon solvent, such as pentane, isopentane, hexane, heptane and octane. The halogenating agent is added to the suspension thus obtained and the resulting suspension is heated to a temperature of $-20°$ C. to $100°$ C., for a period of 0.5 to 5 hours. It is preferable to operate at 70 $-95°$ C. for 1-2 hours.

As previously specified, in step (ii) the molar ratio between the halogenating agent and the magnesium compound is 0.1/1 to 100/1, the best results being obtained with a value of said ratio of about 10/1.

At the end of the halogenation treatment, the solid is separated from the suspension, for example by sedimentation, filtration or centrifugation and is washed with a solvent, such as a liquid aliphatic hydrocarbon solvent and possibly dried.

In step (iii) of the procedure according to the present invention, the halogenated support of step (ii) is submitted to titanation by interaction with a titanium tetrahalide and preferably titanium tetrachloride.

More specifically, the procedure is carried out with an excess of titanium tetrahalide by suspending the halogenated support in the liquid titanium tetrahalide or in solution in one of the above-mentioned inert hydrocarbon solvents. The operating temperature varies from $80°$ to $120°$ C. for a period which, depending on the temperature chosen, can vary from 0.5 to 5.0 hours. In the preferred embodiment the temperature is about $95°$ C. for a period of about 1 hour.

Under these conditions a quantity of titanium of about 3-7% by weight is fixed onto the chlorinated support.

According to the procedure of the present invention in step (iv) the support which has been titanated in step (iii) is put in contact with a Lewis base. Lewis bases (or internal electron donors) which can be used are ethers, amines, esters, alcoholates, silanic compounds, ketones and phosphoramides. The esters used can be of the organic or inorganic type. Aromatic esters such as diisobutylphthalate , alkyl esters of benzoic acid, p-methoxybenzyl acid and p-toluic acid, and aliphatic esters such as diethyl carbonate, ethyl pivalate, ethyl acetate and dimethyl maleate are particularly suitable for the purpose. Other compounds which can be used for the purpose are alkyl aryl silanes and alkoxysilanes.

In the preferred embodiment the Lewis base is added to the reaction mixture obtained at the end of titanation step (iii) and the molar ratio between said Lewis base and the magnesium compound absorbed in step (i) varies from 0.05/1 to 0.5/1, the temperature ranges from $80°$ to $120°$ C. for a period of 0.5 to 5.0 hours. In the preferred embodiment the molar ratio is 0.1/1 to 0.3/1, the temperature about $95°$ C. for a period of about 1 hour.

In this way the solid component of catalyst is obtained and is recovered in step (v) of the procedure and washed with a hydrocarbon solvent and possibly dried.

The solid component of catalyst thus obtained is submitted to one or more treatments with titanium tetrahalide, carried out under the above conditions, to purify the catalyst so that the whole catalytic complex is structurally homogeneous, in order to have stereospecific active centres of the same kind in the polymerization phase.

In another embodiment, the solid component of catalyst is heated in the presence of a liquid aliphatic hydrocarbon to dissolve and remove any possible titanium tetrachloride which has been absorbed on the active surface or on the titanium complex.

In all cases, by operating as described above, a solid component of catalyst is obtained, which is composed of a silica support (10–90% by weight) and a catalytically active part containing magnesium, halogen and titanium, as well as the Lewis base selected. The catalytically active component of the solid catalyst according to the present invention usually contains: 4–8% by weight of magnesium, 20–35% by weight of chlorine, 3–7% by weight of titanium and 1–15% by weight of the Lewis base, wherein the titanium is partly in its trivalent state and partly in its tetravalent state, with a ratio Ti(III)/Ti(IV) generally varying from 0.05/1 to 1/1.

In terms of molar ratios said active part has a composition within the following ranges:

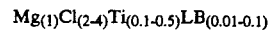

$$Mg_{(1)}Cl_{(2-4)}Ti_{(0.1-0.5)}LB_{(0.01-0.1)}$$

wherein LB=Lewis base.

It has now been experimentally found that the reaction between a magnesium dialkyl and silicon tetrachloride, in a molar ratio of 0.5/1 to 20/1, carried out without the silica support, produces a magnesium chloride solid mixed with greater or lesser quantities of an unknown product, as revealed by X-ray diffraction analysis. More specifically the magnesium chloride thus formed is present in alpha and gamma crystalline forms (considered to be scarsely active), with a limited presence of the delta form (which constitutes the active form). When the magnesium dialkyl is deposited on a silica with a certain content of water and/or hydroxyls (step (i) of the present invention), the treatment with silicon tetrachloride (according to step (ii) produces a very disorderly dispersed phase of magnesium chloride, practically without the peak at $15°$ in the X-ray spectrum, in the form of random oriented lamellae. This magnesium chloride, in its maximum state of disorder, is highly active from a catalytic point of view.

It has now been found, according to the present invention, that useful results are not obtained by first depositing the silicon tetrachloride on the silica containing water and/or hydroxyls and then treating with a magnesium dialkyl, as described in a comparative example. This would seem to indicate that the magnesium dialkyl deposited in step (i) of the present invention, is grafted to the silica (probably by Mg—O—Si type bonds) and that this grafted form is essential for the formation of the highly dispersed magnesium chloride of chlorination step (ii) with titanium tetrachloride. This seems to be confirmed by the fact that useful results are not obtained by using a pre-activated silica, from which the water and hydroxyls have been substantially removed. As shown in a further comparative example, useful results are not obtained by depositing the magnesium chloride onto the silica before treatment with the magnesium dialkyl, and this confirms how critical steps (i) and (ii) are according to the present invention. When tin tetrachloride is used in step (ii) of the present invention, the interaction between this halogenating agent and the magnesium dialkyl seems to lead to the formation of both alkyl compounds of tin, and also to polymer aggregates of an unspecified nature, which however have proved to be useful in the preparation of component of catalyst which is highly active and stereospecific in the polymerization of olefins. It has also been noted that contact between antimony pentachloride and silica containing water and/or hydroxyls, when there is no magnesium dialkyl, causes reduction to metallic antimony. On the other hand, in the presence of magnesium dialkyl, in step (ii) of the present invention, the halogenating agent is reduced from pentavalent to trivalent, and this again proves how critical steps (i) and (ii) of the present invention are.

The present invention also relates to a catalyst for the stereospecific polymerization of propylene and other α-olefins which is composed of: (A) the solid component of catalyst described above; (B) an aluminium trialkyl or halide of aluminium alkyl; and (C) an electron donor compound, capable of forming a complex compound with component (B).

Component (B) of the catalyst is conveniently selected from aluminium trialkyls and halides (especially chlorides) of aluminium alkyl, which contain from 1 to 6 carbon atoms in the alkyl portion. Among these aluminium trialkyls are preferred, such as aluminium triethyl, aluminium tributyl, aluminium triisobutyl and aluminium trihexyl.

Component (C) of the catalyst is conveniently selected from alkoxy silanes which can be defined with the formula $R^1R^2Si(OR^3)(OR^4)$ wherein $R^1$ and $R^2$ are phenyl groups and $R^3$ and $R^4$ are $C_1$-$C_4$ alkyl groups. A specific example of component (C) is dimethoxy diphenyl silane.

In the catalysts of the present invention the atomic ratio between the aluminium (present in component (B)) and the titanium (present in component (A)), may generally vary from 10/1 to 1,000/1 and will preferably be within the range of 50/1 to 150/1. Moreover the molar ratio between components (B) and (C) may generally vary from 5/1 to 20/1 and will preferably be about 10/1.

The catalyst of the present invention is highly active in procedures for the polymerization of propylene and other α-olefins in highly stereospecific polymers. In particular in the polymerization of propylene, polypropylenes are obtained having an isotactic index equal to or higher than 95%. Examples of other α-olefins which can be polymerized using the catalyst of the present invention are butene-1, 4-methylpentene-1 and hexene-1.

The polymerization reaction may be carried out with the suspension technique in an inert diluent, with the loop reactors technique without solvents or diluents, or with the gas-phase technique. The polymerization may generally be carried out at a temperature ranging from room temperature to 120° C. and under a pressure of 1 to 100 atmospheres.

In all cases, operating with the catalyst of the present invention, olefinic polymers are obtained with a particle size which are a precise replica of the solid component used. It is thus possible to produce polymers having the desired particle size of the granules based on the choice of the size and size distribution of the support.

The experimental examples which follow provide a better illustration of the invention.

EXAMPLE 1

20 g of microspheroidal silica (particle size 20–60 μm, surface area 320 m²/g, pore volume 1.6 ml/g, content of $H_2O$ and hydroxyls 3% by weight), 100 ml of anhydrous n-heptane and 140 ml of a 20% by weight solution in n-heptane of magnesium butyl octyl (20.4 g, 122.5 mmoles; $Mg_1But_{1.5}Oct_{0.5}$) are charged, in a nitrogen atmosphere, into a 500 ml flask equipped with a reflux cooler, mechanical stirrer and thermometer. The mixture is left to react for 1 hour at room temperature. The solid is separated by filtration, thoroughly washed with n-hexane and dried by evaporating the solvent. 100 ml of n-heptane and 280 ml of silicon tetrachloride (2450 mmoles) are added to the solid obtained. The mixture is left to react for 1 hour at 65°–70° C., cooled to 30° C. and the liquid siphoned. The solid is thoroughly washed with n-hexane at −20° C. and dried by evaporating the solvent. 466 ml of titanium tetrachloride are added to the solid thus obtained at room temperature and the suspension obtained is slowly heated to 90° C. When this temperature has been reached 3.9 ml of diisobutyl phthalate (DIBP) are added dropwise. In the reaction the following ratio between the reagents are maintained: Mg:Ti:DIBP 1:34.5:0.12. The suspension is kept for 2 hours at 90° C. The liquid is then siphoned at 80° C., the mixture cooled to room temperature, thoroughly washed with n-pentane and dried.

42.2 g of a purplish solid component are obtained in granules with an apparent density of 0.35 g/ml, containing 6.64% by weight of magnesium, 31.06% by weight of chlorine, 5.50% by weight of titanium, of which 20.5% is in a trivalent form.

The solid component of catalyst prepared as described above, is used in a test for the polymerization of propylene.

More specifically, the polymerization is carried out in an autoclave having a volume of 5 liters, equipped with a magnetic stirrer and electrically heated.

After cleansing with a nitrogen flow for 2 hours at 115° C., the autoclave is cooled to room temperature and fed with 2 liters of n-hexane, and heated under stirring to 40° C.

At this stage the catalyst to be introduced is prepared operating as follows:

the solid component, previously weighed, is transferred in an inert atmosphere, into a 200 ml flask, together with a quantity of solvent equal to 5% of the total;

a solution composed of solvent, aluminium triethyl and dimethoxy diphenyl silane is put into the separating funnel connected to the flask from above;

a quantity, equal to 20% of the total amount, of the solution contained in the separating funnel, is fed into the flask below;

at this point the catalyst and then the solution containing the aluminium triethyl and dimethoxy diphenyl silane, are fed into the autoclave.

Hydrogen and propylene in the established quantities are then fed into the autoclave. The autoclave is heated to polymerization temperature. At the end of the polymerization the polymeric suspension obtained is coagulated in a mixture of acetone-ethyl alcohol (volume ratio 2:1). The polymer is filtered and dried in an oven at 60° C.

More specifically in this example 150 mg of solid component of catalyst prepared as described above, 17 mmoles of aluminium triethyl and 1.14 mmoles of dimethoxy dephenyl silane are used and the polymerization is carried out at 70° C., at a total pressure of 15 bar and for a period of 1.5 hours, using 0.5% by volume of hydrogen as the molecular weight regulator.

A yield equal to 2.1 kg of polypropylene per gram of solid component of catalyst is obtained and the polypropylene thus obtained has the following characteristics:

| MFI (5 kg; 230° C.): | 3.4 g/10' |
|---|---|
| (Melt-Flow Index - ASTM D 1238 L) | |
| Apparent density: | 0.38 g/ml |
| II: | 95.3% |

(isotactic index, determined by extraction of the atactic part in heptane at reflux temperature for 24 hours).

The polypropylene is moreover in the form of granules having the following size distribution in μm:

| >2000 | 5.4% by weight |
|---|---|
| 2000< >1000 | 9.2% by weight |
| 1000< >500 | 64.1% by weight |
| 500< >250 | 20.0% by weight |
| 250< >125 | 1.1% by weight |
| 125< >63 | 0.2% by weight |
| <63 | 0.0% by weight |

EXAMPLE 2

10 g of the solid component of catalyst, obtained as described in Example 1, are suspended in 200 ml of n-heptane. The suspension thus obtained is heated for 1 hour at 90° C. and then the excess n-heptane is siphoned under heat. A further 200 ml of n-heptane are added at 60° C. and the resulting suspension is heated for 1 hour at 90° C. and the excess n-heptane is then siphoned under heat. The latter operation is repeated for a further two times and at the end of the treatment 8.7 g of a purplish solid component are obtained, containing 7.1% by weight of magnesium, 28.0% by weight of chlorine, 4.1% by weight of titanium, of which 19% is in a trivalent form.

The solid component of catalyst thus obtained is used in a test for the polymerization of propylene. More specifically, the procedure is similar to Example 1, operating at 70° C., at a total pressure of 15 bar and for a period of 3 hours, using 0.5% by volume of hydrogen as a molecular weight regulator.

A yield equal to 1.62 kg of polypropylene per gram of solid component of catalyst is obtained and the polypropylene thus obtained has the following characteristics:

| MFI (5 kg; 230° C.): | 6.1 g/10' |
|---|---|
| apparent density: | 0.40 g/ml |
| II: | 95% |

The polypropylene is moreover in the form of granules with the following size distribution in μm:

| >2000 | 2.3% by weight |
|---|---|
| 2000< >1000 | 5.3% by weight |
| 1000< >500 | 63.8% by weight |
| 500< >250 | 26.7% by weight |
| 250< >125 | 1.9% by weight |
| 125< >63 | 0.0% by weight |
| <63 | 0.0% by weight |

EXAMPLE 3

10 g of the solid component of catalyst, obtained as described in Example 1, are suspended in 200 ml of titanium tetrachloride. The suspension thus obtained is heated for 1 hour to 90° C. and the excess titanium tetrachloride is then siphoned under heat operating at 90° C. 200 ml of n-heptane are then added and the resulting suspension is heated for 1 hour to 90° C. It is then filtered at the same temperature, the solid cooled to room temperature, washed with n-heptane and dried. 9.4 g of a purplish solid component are obtained, containing 7.0% by weight of magnesium, 30.7% by weight of chlorine, 4.7% by weight of titanium, of which 16.5% is in a trivalent form.

The solid component of catalyst thus obtained is used in a test for the polymerization of propylene. More specifically, the same procedure is used as in Example 1, at a temperature of 70° C., a total pressure of 15 bar and for a period of 3 hours, using hydrogen as a molecular weight regulator.

A yield equal to 3.8 kg of polypropylene per gram of solid component of catalyst is obtained and the polypropylene thus obtained has the following characteristics:

| MFI (5 kg; 230° C.): | 3.6 g/10' |
|---|---|
| apparent density: | 0.41 g/ml |
| II: | 95% |

The polypropylene is moreover in the form of granules having the following size distribution:

| >2000 | 0.0% by weight |
|---|---|
| 2000< >1000 | 15.9% by weight |
| 1000< >500 | 69.7% by weight |
| 500< >250 | 14.2% by weight |
| 250< >125 | 0.2% by weight |
| 125< >63 | 0.0% by weight |
| <63 | 0.0% by weight |

In an identical polymerization test, but carried out for 4 hours a yield equal to 4.7 kg of polypropylene per gram of solid component of catalyst is obtained and the polypropylene thus obtained has the following characteristics:

| MFI (5 kg; 230° C.): | 1.5 g/10' |
|---|---|
| apparent density: | 0.41 g/ml |
| II: | 95% |

The polypropylene is moreover i the form of spheroidal granules with the following size distribution:

| >2000 | 0.0% by weight |
|---|---|
| 2000< >1000 | 20.5% by weight |
| 1000< >500 | 62.2% by weight |
| 500< >250 | 16.6% by weight |
| 250< >125 | 0.7% by weight |
| 125< >63 | 0.0% by weight |
| <63 | 0.0% by weight |

EXAMPLE 4

A solid component of catalyst is prepared using the same procedure as described in Example 1 in the reaction between silica and magnesium butyl octyl and in the subsequent reaction with silicon tetrachloride.

645 ml of titanium tetrachloride are added to 20 g of the solid thus obtained at room temperature and the suspension obtained is slowly heated to 110° C. and kept at this temperature for 30 minutes. 3.9 ml of diisobutyl phthalate (DIBP) are then added dropwise. The following ratios between the reagents are maintained in the reaction: Mg:Ti:DIBP 1:34.5:0.12 (as in Example 1). The suspension is kept for 2 hours at 90° C. and then heated for 1.5 hours to 110° C. under stirring. It is filtered under heat at 95° C., 400 ml of fresh titanium tetrachloride are added and the temperature is kept at 90° C. for 1 hour. The liquid is siphoned under heat (temperature $\geq$ 80° C.), the mixture is washed four times with 200 ml of n-heptane each time at a temperature of $\geq$ 90° C., twice with n-heptane at room temperature and then dried.

A purplish-brown solid is obtained in granules with an apparent density of 0.36 ml/g, containing 6.9% by weight of magnesium, 22.3% by weight of chlorine, 4.5% by weight of titanium, of which 22.3% is in a trivalent form.

The solid component of catalyst thus obtained is used in a test for the polymerization of propylene. In this test 150 mg of the solid component, 14 mmoles of aluminium triethyl and 1.14 mmoles of dimethoxy diphenyl silane are used. The operating temperature is 70° C., the total pressure 15 bar and for a period of 3 hours, using 0.5% by volume of hydrogen as a molecular weight regulator.

A yield equal to 3.5 kg of polypropylene per gram of solid component of catalyst is obtained and the polypropylene thus obtained has the following characteristics:

| MFI (5 kg; 230° C.): | 2.0 g/10' |
|---|---|
| apparent density: | 0.39 g/ml |
| II: | 94% |

The polypropylene is moreover in the form of granules with the following size distribution in μm:

| >2000 | 0.0% by weight |
|---|---|
| 2000< >1000 | 9.2% by weight |
| 1000< >500 | 71.2% by weight |
| 500< >250 | 19.1% by weight |
| 250< >125 | 0.5% by weight |
| 125< >63 | 0.0% by weight |
| <63 | 0.0% by weight |

EXAMPLE 5

A solid component of catalyst is prepared using the same procedure as Example 1 in the reaction between silica and magnesium butyl octyl and in the subsequent reaction with silicon tetrachloride.

645 ml of titanium tetrachloride are added at room temperature to 20 g of the solid thus obtained and the suspension obtained is slowly heated to 90° C. and 7.8 ml of diisobutyl phthalate (DIBP) are added dropwise. The following ratios between the reagents are maintained in the reaction: Mg:Ti:DIBP 1:34.5:0.24. The suspension is kept for 2 hours at 90° C. under stirring. It is siphoned under heat at 95° C., 400 ml of fresh titanium tetrachloride are added and the temperature is kept at 90° C. for 1 hour. The liquid is siphoned under heat (temperature $\geq$ 80° C.), the mixture is washed four times with 200 ml of n-heptane each time and at a temperature of $\geq$ 90° C., twice with n-heptane at room temperature and then dried.

A purplish-brown solid is obtained, in granules with an apparent density of 0.35 ml/g, containing 5.7% by weight of magnesium, 30.8% by weight of chlorine, 5.7% by weight of titanium, of which 12% is in a trivalent form.

The solid component of catalyst thus obtained is used in a test for the polymerization of propylene. In this test 150 mg of the solid component, 18 mmoles of aluminium triethyl and 1.14 mmoles of dimethoxy diphenyl silane are used. The test is carried out at a temperature of 70° C., at a total pressure of 15 bar and for a period of 3 hours, using 0.5% by volume of hydrogen as a molecular weight regulator.

A yield equal to 2.7 kg of polypropylene per gram of solid component of catalyst is obtained and the polypropylene thus obtained has the following characteristics:

| MFI (5 kg; 230° C.): | 3.6 g/10' |
|---|---|
| apparent density: | 0.40 g/ml |
| II: | 96% |

The polypropylene is moreover in the form of granules with the following size distribution in μm:

| >2000 | 0.2% by weight |
|---|---|
| 2000< >1000 | 10.2% by weight |
| 1000< >500 | 73.6% by weight |
| 500< >250 | 15.2% by weight |
| 250< >125 | 0.5% by weight |
| 125< >63 | 0.3% by weight |
| <63 | 0.0% by weight |

EXAMPLE 6

20 g of silica having the characteristics specified in Example 1, 100 ml of anhydrous n-heptane and 140 ml of a 20% by weight solution in n-heptane of magnesium butyl octyl (20.4 g, 122.5 mmoles; $Mg_1But_{1.5}Oct_{0.5}$) are charged, in a nitrogen atmosphere, into a 500 ml flask equipped with a reflux cooler, mechanical stirrer and thermometer. The mixture is left to react for 1 hour at room temperature. The solid is separated by filtration, thoroughly washed with n-hexane and dried by evaporating the solvent. 100 ml of n-heptane are added to the solid thus obtained and, the temperature is brought to −20° C., under stirring. When this temperature has been reached 14.4 ml of tin tetrachloride (122.5 mmoles) are added. The temperature is brought in 30 minutes to the above established value and the mixture is left under these conditions for 1 hour. It is then heated to 70° C., left for 1 hour at this temperature, cooled to room temperature and the liquid siphoned. The treatment is repeated with a further 14.4 ml of tin tetrachloride. At the end of this second chlorinating treatment, the liquid is siphoned at room temperature and the solid is washed five times with 300 ml of n-hexane each time at −20° C. and twice with n-pentane at 0° C. It is dried in a nitrogen flow at atmospheric pressure and at a temperature lower than 40° C.

466 ml of titanium tetrachloride are added at room temperature to the solid thus obtained and the suspension obtained is slowly heated to 90° C. When this temperature has been reached, 3.9 ml of diisobutyl phthalate (DIBP) are added dropwise. The following ratios between the reagents are maintained in the reaction: Mg:Ti:DIBP 1:34.5:0.12. The suspension is kept for 2 hours at 90° C. The liquid is then siphoned at 90° C., a further 466 ml of titanium tetrachloride are added and the mixture is kept for a further hour at 90° C. It is then siphoned under heat and washed twice with 400 ml of n-heptane at 90° C. It is siphoned under heat and washed four times with 300 ml of n-pentane each time at room temperature and dried in a nitrogen flow at atmospheric pressure and at a temperature lower than 40° C.

22.9 g of a pale pink solid component are thus obtained in granules with an apparent density of 0.29 g/ml, containing 7.14% by weight of magnesium, 30.27% by weight of chlorine, 4.49% by weight of titanium, of which 9.2% is in a trivalent form.

The solid component of catalyst prepared as described above, is used in a test for the polymerization of propylene. More specifically the test is carried out as in Example 1, at a temperature of 70° C., a total pressure of 15 bar and for a period of 3 hours, using hydrogen as a molecular weight regulator.

A yield equal to 4.84 kg of polypropylene per gram of solid component of catalyst is obtained and the polypropylene thus obtained has the following characteristics:

| MFI (5 kg; 230° C.): | 5.4 g/10'. |
|---|---|
| apparent density: | 0.41 g/ml |
| II: | 95% |

The polypropylene is moreover in the form of granules with the following size distribution in μm:

| >2000 | 2.1% by weight |
|---|---|
| 2000< >1000 | 15.8% by weight |
| 1000< >500 | 59.7% by weight |
| 500< >250 | 14.5% by weight |
| 250< >125 | 4.9% by weight |
| 125< >63 | 3.0% by weight |
| <63 | 0.0% by weight |

EXAMPLE 7

In this example a solid component of catalyst is used, obtained as described in Example 1, but containing 7.3% by weight of magnesium, 31.8% by weight of chlorine, 3.6% by weight of titanium, of which 7% in a trivalent form.

This solid component of catalyst is used in a test for the polymerization of propylene. More specifically 74 mg of solid component, 5.7 mmoles of aluminium triethyl and 0.53 mmoles of dimethoxy diphenyl silane are used and the test is carried out at a temperature of 70° C., a total pressure of 30 bar and for a period of 4 hours, using 0.5% by volume of hydrogen as a molecular weight regulator.

A yield equal to 5.3 kg of polypropylene per gram of solid component of catalyst is obtained and the polypropylene thus obtained has the following characteristics:

| MFI (5 kg; 230° C.): | 3.2 g/10' |
|---|---|
| apparent density: | 0.46 g/ml |
| II: | 95.5% |

The polypropylene is moreover in the form of granules with the following size distribution in μm:

| >2000 | 0.9% by weight |
|---|---|
| 2000< >1000 | 34.1% by weight |
| 1000< >500 | 56.3% by weight |
| 500< >250 | 8.5% by weight |
| 250< >125 | 0.2% by weight |
| 125< >63 | 0.0% by weight |
| <63 | 0.0% by weight |

EXAMPLE 8

The solid component of catalyst prepared as described in Example 1 is used in a test for the polymerization of liquid propylene. More specifically the polymerization is carried out in an autoclave having a volume of 2.8 liters, equipped with a magnetic stirrer and electrically heated. After cleansing with a nitrogen flow for 2 hours at 115° C., the autoclave is cooled to room temperature and fed with 2,000 ml of propylene and heated under stirring to 40 C.

At this stage the catalyst to be introduced is prepared as follows:

the solid component, previously weighed, is transferred, in an inert atmosphere, to a 200 ml flask, together with 50 ml of n-hexane;

a solution of 200 ml composed of n-hexane, aluminium triethyl an dimethoxy diphenyl silane is placed into the separating funnel connected to the top of the flask;

an amount, equal to 20% of the total of the solution contained in the separating funnel, is fed into the flask below;

at this stage the catalyst and subsequently the solution containing the aluminium triethyl and dimethoxy diphenyl silane are fed into the autoclave.

The quantity of hydrogen corresponding to the desired molecular weight is fed into the autoclave. The autoclave is heated to polymerization temperature. At the end of the polymerization it is degassed and the polymer is dried in an oven at 60° C.

More specifically in this example 100 mg of the solid component of catalyst of Example 1, 8.5 mmoles of aluminium triethyl and 0.57 mmoles of dimethoxy diphenyl silane are used and the polymerization is carried out at a temperature of 70° C., a total pressure of 30 bar and for a period of 3 hours, using hydrogen as a molecular weight regulator.

A yield equal to 5.5 kg of polypropylene per gram of solid component of catalyst is obtained and the polypropylene thus obtained has the following characteristics:

| MFI (5 kg; 230° C.): | 0.65 g/10' |
|---|---|
| apparent density: | 0.48 g/ml |
| II: | 97.3% |

The polypropylene is moreover in the form of granules with the following size distribution in μm:

| >2000 | 0.0% by weight |
|---|---|
| 2000< >1000 | 24.7% by weight |
| 1000< >500 | 61.6% by weight |
| 500< >250 | 12.0% by weight |
| 250< >125 | 1.0% by weight |
| 125< >63 | 0.5% by weight |
| <63 | 0.2% by weight |

EXAMPLE 9 (comparative)

10.5 mmoles of anhydrous magnesium chloride are dissolved in 250 ml of ethyl acetate.

20 g of silica having the characteristics specified in the description and the solution of magnesium chloride in ethyl acetate prepared above are charged, in a nitrogen atmosphere, into a 500 ml flask equipped with a reflux cooler, mechanical stirrer and thermometer. The mixture is heated to reflux temperature for 1 hour and siphoned at a temperature lower than 40° C. At this stage 60 ml of a 20% by weight solution in n-heptane of magnesium butyl octyl (87 g, 52.5 mmoles; $Mg_1But_{1.5}Oct_{0.5}$) are added. The mixture is left to react for 1 hour at room temperature. The solid is separated by filtration, thoroughly washed with n-hexane and dried by evaporating the residuous solvent. 144 ml of silicon tetrachloride (1257 mmoles) ar added to the solid thus obtained. The mixture is left to react for 1 hour at reflux temperature (60°–70° C.), cooled to 30° C. and the liquid siphoned. The solid is thoroughly washed with n-hexane at −20° C. and dried by evaporating the solvent.

207 ml of titanium tetrachloride are added at room temperature to the solid thus obtained and the suspension obtained is slowly heated to 90° C. When this temperature has been reached 1.73 ml of diisobutyl phthalate (DIBP) are added dropwise. The following ratios between the reagents are maintained in the reaction: Mg:Ti:DIBP 1:34.5:0.12. The suspension is kept for 2 hours at 90° C. The liquid is then siphoned at 90° C., and a further 207 ml of titanium tetrachloride are added and the mixture kept for another hour at 90° C. It is then siphoned under heat and washed twice with 400 ml of n-heptane at 90° C. It is siphoned under heat and washed four times with 300 ml each time of n-pentane at room temperature and dried in a nitrogen flow at atmospheric pressure and at a temperature lower than 40° C.

26 g of a pale pink solid component is obtained in granules with an apparent density of 0.28 g/ml, containing 6.87% by weight of magnesium, 29.65% by weight of chlorine, 2.13% by weight of titanium, of which 9.6% in a trivalent form.

The solid component of catalyst prepared as described above, is used in a test for the polymerization of propylene. More specifically, the polymerization is carried out as described in Example 1, at a temperature of 70° C., a total pressure of 15 bar and for a period of 3 hours, using hydrogen as a molecular weight regulator.

A yield equal to 0.18 kg of polypropylene per gram of solid component of catalyst is obtained and the polypropylene thus obtained has an isotactic index less than 75%.

EXAMPLE 10 (COMPARATIVE)

20 g of silica having the characteristics specified in the description, 100 ml of anhydrous n-heptane are charged, in a nitrogen atmosphere, into a 500 ml flask equipped with a reflux cooler, mechanical stirrer and thermometer and 140 ml of silicon tetrachloride (1,222 mmoles) are slowly added dropwise at room temperature and under stirring. The mixture is heated to reflux temperature (65°–70° C.) for 1 hour. It is then siphoned and left at a temperature lower than 40° C. After adding 100 ml of anhydrous n-heptane, 140 ml of a 20% by weight solution in n-heptane of magnesium butyl octyl ($Mg_1But_{1.5}Oct_{0.5}$; 20.4 g, 122.5 mmoles) are slowly added dropwise. The mixture is left to react for 1 hour at room temperature. The solid is separated by filtration and thoroughly washed with n-hexane. At this stage 100 ml of n-heptane are added and 140 ml of silicon tetrachloride (1,222 mmoles) are slowly added dropwise. The mixture is left to react for 1 hour at 65°–70° C., cooled to 30° C. and the liquid siphoned. The solid is thoroughly washed with n-hexane at −20° C. and dried by evaporating the residuous solvent.

466 ml of titanium tetrachloride are added at room temperature to the solid thus obtained and the suspension obtained is slowly heated to 90° C. When this temperature has been reached 3.9 ml (14.7 mmoles) of diisobutyl phthalate (DIBP) are added dropwise. The following ratios between the reagents are maintained in the reaction: Mg:Ti:DIBP 1:34.5:0.12. The suspension is kept for 2 hours at 90 C. The liquid is then siphoned at 90° C., and a further 466 ml of titanium tetrachloride are added and the Whole mixture is kept for another hour at 90° C. It is then siphoned under heat (90° C.) and washed twice with 400 ml of n-heptane at 90° C. It is siphoned under heat and washed 4 times with 300 ml each time of n-pentane at room temperature and dried in a nitrogen flow at atmospheric pressure and at a temperature lower than 40° C.

28 g of a pale pink solid component of catalyst are thus obtained in granules with an apparent density of 0.28 g/ml, containing 4.48% by weight of magnesium, 17.97% by weight of chlorine, 1.89% by weight of titanium, of which 12% in a trivalent form.

The solid component of catalyst prepared as described above, is used in a test for the polymerization of propylene. More specifically, the same procedure is used as described in Example 1, at a temperature of 70° C., a total pressure of 15 bar and for a period of 3 hours, using hydrogen as a molecular weight regulator.

A yield equal to 1.39 kg of polypropylene per gram of solid component of catalyst is obtained and the polypropylene thus obtained has the following characteristics:

| MFI (5 kg; 230° C.): | 5.7 g/10' |
|---|---|
| apparent density: | 0.39 g/ml |
| II: | 78% |

The polypropylene is moreover in the form of granules with the following size distribution in μm:

| >2000 | 0.0% by weight |
|---|---|

-continued

| | |
|---|---|
| 2000< >1000 | 1.0% by weight |
| 1000< >500 | 75.0% by weight |
| 500< >250 | 24.3% by weight |
| 250< >125 | 1.7% by weight |
| 125< >63 | 0.0% by weight |
| <63 | 0.0% by weight |

We claim:

1. Procedure for the preparation of a solid component of catalyst, active in the polymerization of propylene and other α-olefins into stereoregular polymers, composed of a silica support and a catalytically active part including magnesium, halogen, titanium and a Lewis base, which includes:
   (i) treating a non-activated silica support by contact of said silica with a solution, in an inert hydrocarbon solvent, of a magnesium dialkyl or halide of magnesium alkyl, operating with a weight ratio between the magnesium compound and the silica of 0.1/1 to 10/1, at a temperature ranging from 20° C. to the boiling point of the liquid phase, for a period which is sufficient to completely, or almost completely deposit the magnesium compound onto the silica;
   (ii) halogenating the support treated in (i) by contact of said activated support with a solution, in an inert hydrocarbon solvent, of a halogenating agent selected from silicon, tin or antimony halides, operating with a molar ratio between the halogenating agent and the magnesium compound deposited in step (i) of 0.1/1 to 100/1, at a temperature ranging from −20° C. to 100° C. and for a period of 0.5 to 5.0 hours;
   (iii) titanating the support halogenated in (ii) by contact of said halogenated support with an excess of a titanium tetrahalide either liquid or in solution in an inert hydrocarbon solvent, operating at a temperature ranging from 80° to 120° C. and for a period of 0.5 to 5.0 hours.
   (iv) forming the solid component of catalyst by contact of the support titanated in (iii) with a Lewis base either liquid or in solution in an inert hydrocarbon solvent, operating with a ratio between said Lewis base and the magnesium compound absorbed in step (i) of 0.05/1 to 0.5/1, at a temperature ranging from 80° to 120° C. and for a period of 0.5 to 5.0 hours; and
   (v) recovering the solid component of catalyst from the reaction products of step (iv).

2. Procedure according to claim 1, wherein in step (i) a microspheroidal and porous silica is used, with a particle size of 20 to 100 μm, a surface area of 150 to 400 m²/g, a pore volume of 1.3 to 1.8 ml/g and an average pore diameter of 20 to 30 A (angstrom), containing a total quantity of hydroxyls and water of 1 to 5% by weight.

3. Procedure according to claim 1, wherein in step (i) a magnesium dialkyl or halide of magnesium alkyl is used, which is defined by the formulae MgRR' or MgR"X, wherein R, R' and R" each independently represent an alkyl group, linear or branched, containing from 1 to 12 carbon atoms and X represents a halogen atom.

4. Procedure according to claim 1, wherein step (i) is carried out in an inert hydrocarbon solvent selected from the group consisting of pentane, isopentane, hexane, heptane and octane, at a temperature of 50°-70° C., with a weight ratio between the magnesium compound and the silica of 0.2/1 to 1.5/1 for a period of 10 minutes to 2 hours.

5. Procedure according to claim 1, wherein step (i) is carried out with a halogenating agent selected from the group consisting of silicon chlorides and bromides, chloro and bromo silanes and tin and antimony chlorides and bromides.

6. Procedure according to claim 5, wherein said halogenating agent is silicon tetrachloride or tin tetrachloride.

7. Procedure according to claim 1, wherein step (ii) is carried out at 70°-95° C. for 1-2 hours, with a molar ratio between the halogenating agent and the magnesium compound of 10/1.

8. Procedure according to claim 1, wherein step (iii) is carried out at a temperature of 95° C., for a period of 1 hour.

9. Procedure according to claim 1, wherein step (iv) is carried out with a Lewis base selected from the group consisting of ethers, amines, esters, alcoholates, silanic compounds, ketones and phosphoramides.

10. Procedure according to claim 9, wherein said Lewis base is selected from the group consisting of aromatic esters, alkyl esters of benzoic acid, p-methoxybenzoic acid and p-toluic acid, aliphatic esters, alkyl aryl silanes and alkoxysilanes.

11. Procedure according to claim 1, wherein the solid component of catalyst recovered in step (v) is submitted to one or more treatments with titanium tetrahalide, or is heated in the presence of a liquid aliphatic hydrocarbon.

12. Solid component of catalyst for the stereospecific polymerization of olefins, obtained according to claim 1, composed of a silica support (10-90% by weight) and a catalytically active part containing: 4-8% by weight of magnesium, 20-35% by weight of chlorine, 3-7% by weight of titanium and 1-15% by weight of a Lewis base, wherein the titanium is partly in its trivalent state and partly in its tetravalent state, with a molar ratio Ti(III)/Ti(IV) of 0.05/1 to 1/1.

13. Catalyst for the stereospecific polymerization of propylene and other α-olefins composed of: (A) the solid component of catalyst according to claim 12; (B) an aluminium trialkyl or aluminium alkyl halide; and (C) an electron donor compound, capable of forming a complex compound with component (B).

14. Catalyst according to claim 13, wherein said component (B) is selected from the group consisting of aluminium trialkyls and halides of aluminium alkyl, which contain from 1 to 6 carbon atoms in the alkyl portion.

15. Catalyst according to claim 13, wherein said component (C) is selected from alkoxy silanes which are defined by the formula $R^1R^2Si(OR^3)(OR^4)$ wherein $R^1$ and $R^2$ are phenyl groups and $R^3$ and $R^4$ are $C_1$-$C_4$ alkyl groups.

16. Catalyst according to claim 13, wherein the atomic ratio between the aluminium present in component (B) and the titanium, ranges from 10/1 to 1,000/1; and the molar ratio between components (B) and (C) ranges from 5/1 to 20/1.

17. Procedure according to claim 3, wherein the magnesium dialkyl is selected from the group consisting of magnesium diethyl, magnesium ethyl butyl, magnesium dihexyl, magnesium butyl octyl and magnesium dioctyl and wherein the halide of magnesium alkyl is the chloride.

18. Procedure according to claim 4, wherein the weight ratio between the magnesium compound and the silica is 1/1.

19. Procedure according to claim 18, wherein step (i) is carried out for a period of 0.5-1.0 hour.

20. Procedure according to claim 10, wherein the Lewis base is diisobutylphthalate.

21. Procedure according to claim 10, wherein the Lewis base is selected from the group consisting of diethyl carbonate, ethyl privalate, ethyl acetate and dimethyl maleate.

22. Catalyst according to claim 14, wherein the halides of aluminium alkyl are the chlorides.

23. Catalyst according to claim 13, wherein component (B) is selected from the group consisting of aluminium triethyl, aluminium tributyl, aluminium triisobutyl and aluminium trihexyl.

24. Catalyst according to claim 15, wherein component (C) is dimethoxy diphenyl silane.

25. Catalyst according to claim 16, wherein the atomic ratio between the aluminium present in component (B) and the titanium present in component (A) is within the range of 50/1 to 150/1.

26. Catalyst according to claim 16, wherein the molar ratio between components (B) and (C) is 10/1.

* * * * *

UNITED STATES PATENT AND TRADEMARK OFFICE
CERTIFICATE OF CORRECTION

PATENT NO. : 5,310,716
DATED      : May 10, 1994
INVENTOR(S): Luciano Luciani, Federico Milani, Renzo Invernizzi, Italo Borghi, Antonio Labianco It is certified that error appears in the above-indentified patent and that said Letters Patent is hereby corrected as shown below:

On title page,

At Item [75] Inventors: "Ludiano" should read --Luciano--.

Signed and Sealed this

Sixteenth Day of August, 1994

BRUCE LEHMAN

Attest:

Attesting Officer

Commissioner of Patents and Trademarks